US011551871B2

(12) United States Patent
Chun et al.

(10) Patent No.: US 11,551,871 B2
(45) Date of Patent: Jan. 10, 2023

(54) DIELECTRIC COMPOSITION AND CAPACITOR COMPONENT USING THE SAME

(71) Applicant: SAMSUNG ELECTRO-MECHANICS CO., LTD., Suwon-si (KR)

(72) Inventors: Jin Sung Chun, Suwon-si (KR); Seul Gi Kim, Suwon-si (KR); Hyo Kyong Seo, Suwon-si (KR); Hae Suk Chung, Suwon-si (KR); Byung Sung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/149,538

(22) Filed: Jan. 14, 2021

(65) Prior Publication Data

US 2021/0134528 A1 May 6, 2021

Related U.S. Application Data

(62) Division of application No. 16/275,785, filed on Feb. 14, 2019, now abandoned.

(30) Foreign Application Priority Data

Nov. 16, 2018 (KR) .................. 10-2018-0141895

(51) Int. Cl.
*H01G 4/12* (2006.01)
*H01G 4/30* (2006.01)
*H01G 4/008* (2006.01)
*H01G 4/248* (2006.01)
*H01G 4/012* (2006.01)

(52) U.S. Cl.
CPC ........... *H01G 4/1245* (2013.01); *H01G 4/008* (2013.01); *H01G 4/012* (2013.01); *H01G 4/1227* (2013.01); *H01G 4/248* (2013.01); *H01G 4/30* (2013.01)

(58) Field of Classification Search
CPC ........ H01G 4/1245; H01G 4/30; H01G 4/008; H01G 4/248; H01G 4/1227; H01G 40/12
See application file for complete search history.

(56) References Cited

U.S. PATENT DOCUMENTS

| 2001/0010617 | A1 | 8/2001 | Miyazaki et al. |
| 2011/0154660 | A1 | 6/2011 | Kim et al. |
| 2014/0111300 | A1 | 4/2014 | Park et al. |
| 2014/0153156 | A1 | 6/2014 | Park et al. |
| 2014/0204502 | A1 | 7/2014 | Chun et al. |
| 2017/0178811 | A1 | 6/2017 | Chun et al. |

FOREIGN PATENT DOCUMENTS

| CN | 103854858 A | 6/2014 |
| CN | 106910631 A | 6/2017 |
| KR | 10-0388778 B1 | 6/2003 |
| KR | 10-2006-0087558 A | 8/2006 |
| KR | 10-2014-0072728 A | 6/2014 |
| KR | 10-2014-0095361 A | 8/2014 |
| KR | 10-1709815 B1 | 2/2017 |

OTHER PUBLICATIONS

Tseng et al., Effect of polyvinyl butyral on the rheological properties of BaTiO3 powder in ethanol-isopropnaol mixtures, Materials Letters 57 (2002) 223-228 (Year: 2002).*
Wenjea J. Tseng et al., "Effect of polyvinyl butyral on the rheological properties of BaTiO3 powder in ethanol-isopropanol mixtures," Materials Letters 57 (2002) 223-228.
Office Action issued in corresponding Korean Application No. 10-2018-0141895 dated Jan. 17, 2020, with English translation.
Final Office Action issued in corresponding Korean Application No. 10-2018-0141895 dated Jul. 10, 2020, with English translation.
Office Action issued in corresponding U.S. Appl. No. 16/275,785 dated Oct. 16, 2020.
Chinese Office Action dated Jun. 15, 2022, issued in corresponding Chinese Patent Application No. 201910302963.X (with English translation).

* cited by examiner

*Primary Examiner* — Robert D Harlan
(74) *Attorney, Agent, or Firm* — Morgan, Lewis & Bockius LLP

(57) ABSTRACT

A dielectric composition includes a ceramic powder, a high polymerization binder, and a low polymerization binder type dispersant having a degree of polymerization between 100 and 1,000.

20 Claims, 6 Drawing Sheets

'P2'

I - I'

DIELECTRIC COMPOSITION AND CAPACITOR COMPONENT USING THE SAME

CROSS-REFERENCE TO RELATED APPLICATION(S)

This application is the divisional application of U.S. patent application Ser. No. 16/275,785 filed on Feb. 14, 2019, which claims benefit of priority to Korean Patent Application No. 10-2018-0141895 filed on Nov. 16, 2018 in the Korean Intellectual Property Office, the disclosures of which are incorporated herein by reference in their entirety.

BACKGROUND

1. Field

The present disclosure relates to a dielectric composition to which a non-phosphate dispersant is applied and a capacitor component using the same.

2. Description of Related Art

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, have been miniaturized and increased in power, there has been increased demand for miniaturized and high capacity multilayer ceramic capacitors.

Recently, there has been increased interest in electrical components, and multilayer ceramic capacitors have been required to have high reliability and high strength properties to be used in vehicles or infotainment systems.

To this end, grains included in a dielectric sheet may be required to have an appropriate grain size and to have uniform grain size distribution.

In the prior art, a phosphate dispersant including phosphoric acid may be used to disperse a dielectric powder, but a large amount of a secondary phase which becomes impurities may be created after sintering, and thus, abnormal grain growth may be facilitated. Thus, a non-phosphate dispersant which does not include phosphoric acid, while securing sufficient dispersion force, may be necessary.

SUMMARY

An aspect of the present disclosure is to provide a dielectric composition to which a non-phosphate dispersant is applied and a capacitor component using the same.

According to an aspect of the present disclosure, a dielectric composition includes a ceramic powder, a high polymerization binder, and a low polymerization binder type dispersant having a degree of polymerization between 100 and 1,000.

According to another aspect of the present disclosure, a capacitor component includes a body comprising a dielectric layer, and first and second internal electrodes opposing each other with the dielectric layer interposed therebetween, and first and second external electrodes disposed externally on the body and electrically connected to the first and second internal electrodes, respectively. The dielectric layer contains phosphorus (P) in an amount of 0.1 wt % or lower.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
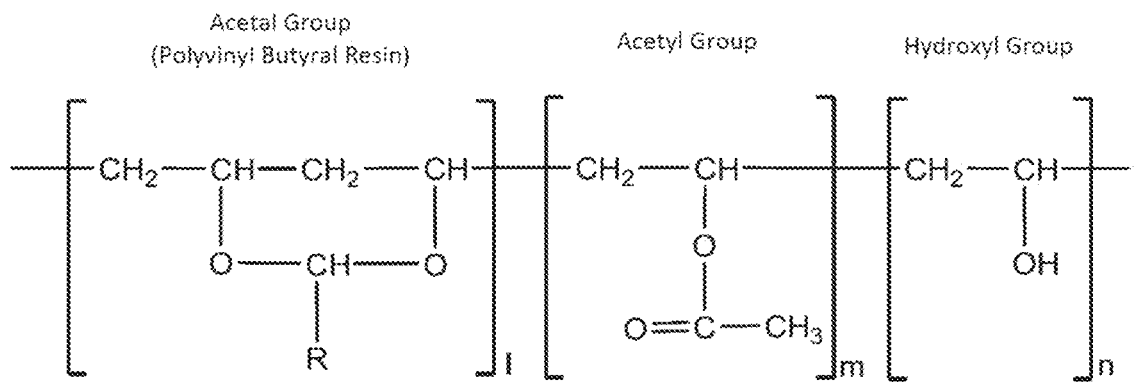
FIG. 1 is a structural formula of one example of a polyvinyl butyral dispersant.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

In the drawings, certain elements may be omitted to clearly describe the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Dielectric Composition

A dielectric composition according to an exemplary embodiment may include a ceramic powder, a high polymerization binder, and a low polymerization binder type dispersant having a degree of polymerization between 100 and 1,000.

The ceramic powder may be a barium titanate ($BaTiO_3$) powder. The ceramic powder may have one or more elements such as calcium (Ca), zirconium (Zr), tin (Sn), or the like, employed in barium titanate such as $(Ba_{1-x}Ca_x)(Ti_{1-y}Ca_y)O_3$, $(Ba_{1-z}Ca_x)(Ti_{1-y}Zr_y)O_3$, $Ba(Ti_{1-y}Zr_y)O_3$, or $(Ba_{1-x}Ca_x)(Ti_{1-y}Sn_y)O_3$, wherein x is 0 to 0.9, and y is 0 to 0.9, or a mixture thereof, but the ceramic powder is not limited thereto.

The low polymerization binder type dispersant having a degree of polymerization between 100 and 1,000 in the exemplary embodiment may not include phosphoric acid, and a secondary phase and an abnormal grain growth may thus be prevented. By preventing abnormal grain growth, a dielectric layer having a uniform microstructure may be manufactured, and reliability of a capacitor component may improve. Also, by using a low polymerization binder type dispersant in accordance with the exemplary embodiment, viscosity of the dielectric composition may be adjusted, thereby reducing the time required for an evaporating operation. The viscosity of the dielectric composition may be about 50 to about 300 (CPS).

A multilayer ceramic capacitor may be manufactured by processes such as an arranging process (a process of preparing a dielectric composition), a process of forming a sheet, a process of printing an internal electrode, a layering process, a compressing process, a cutting process, a plasticizing process, a sintering process, a process of forming an external electrode, a burn-in process, a plating process, a measuring process, and the like, and the arranging process (a process of preparing a dielectric composition), the initial process, may greatly affect properties of a multilayer ceramic capacitor.

When a dielectric composition is prepared, a dispersant may be used for uniform dispersion between a ceramic powder and a binder. Representative dispersion methods for uniform dispersion may be an electrostatic repulsion dispersion method and a steric hindrance dispersion method. The electrostatic repulsion dispersion method uses a phosphate dispersant to endow a ceramic powder with electrostatic repulsion properties.

Figure 3:
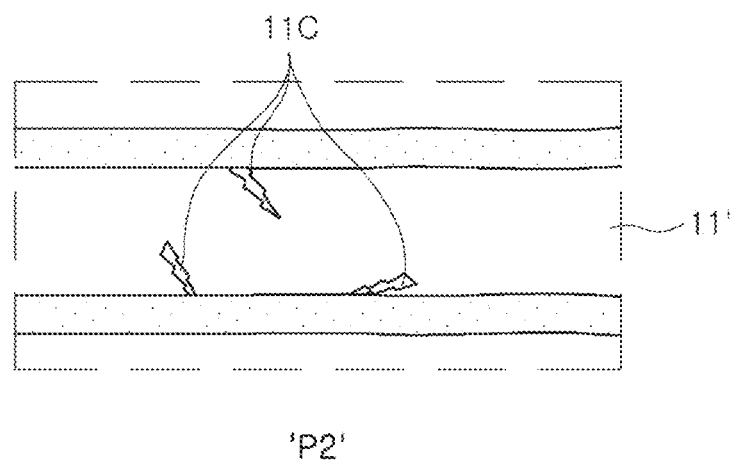
FIG. 3 is a schematic diagram illustrating an abnormal grain growth of a dielectric layer.

FIG. 3 is a schematic diagram illustrating an abnormal grain growth 11c of a dielectric layer 11' when a multilayer ceramic capacitor is manufactured using a phosphate dispersant.

Referring to FIG. 3, when a chip is manufactured using an inorganic phosphate dispersant, an optimal sintering temperature may be locally changed by phosphoric acid, and an abnormal grain growth 11c may occur by non-uniform arrangement of atoms during a dielectric sintering process. Accordingly, when a chip is finally manufactured, a microstructure may be non-uniform, or numerous weak points causing cracks may be created, which may lead to degradation of properties of a multilayer ceramic capacitor.

In the case in which a multilayer ceramic capacitor is manufactured using a phosphate dispersant, phosphoric acid may exist in P2O5 form, and may become liquid at 520° C. during a sintering process, and a homogeneous surface doping layer may be formed on a ceramic powder. Thereafter, when the temperature continuously increases to be higher than 520° C., the P2O5 doped on the surface may react with BaO components included in the ceramic powder, and a variety of barium phosphorus (Ba—P) intermediate compounds may be created, and as barium (Ba) included in the ceramic powder is exhausted, a titanium oxide-rich phase may be formed. The titanium oxide may facilitate the sintering by forming liquid at 1310° C., a BaTiO3-TiO2 eutectic temperature, and may cause abnormal grain growth. Also, the intermediate compounds may exist as a secondary phase. The secondary phase and the abnormally grown grains may degrade breakdown voltage (BDV) properties, high acceleration lifespan properties, and the like, which may degrade reliability of the multilayer ceramic electronic component.

By using the low polymerization binder type dispersant, the dispersibility of the dielectric composition is improved, and abnormal grain growth during sintering can be decreased. The low polymerization binder type dispersant according to the exemplary embodiment may have a degree of polymerization of between 100 and 1,000. In one embodiment of the present invention, the lower polymerization binder type dispersant may have a degree of polymerization of 200, 300, 400, 500, 600, 700, 800, or 900.

When a degree of polymerization is less than 100, dispersibility may be uniformly secured, but it may be difficult to control stretchability due to a plasticizing effect when a green sheet is manufactured using a dielectric compound. When a degree of polymerization is greater than 1,000, the dispersibility may degrade, and compatibilities with the binder may also degrade, which may lead to degradation of surface roughness of the green sheet.

The low polymerization binder type dispersant may be a polyvinyl butyral dispersant. More particularly, the low polymerization binder type dispersant may have a structural formula of a polyvinyl butyral dispersant represented by the following formula (I):

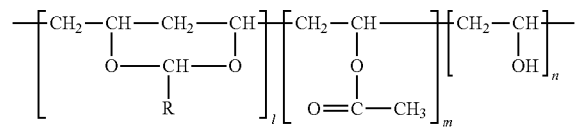

Formula (I)

wherein in the formula (I):
R may be a liner- or branched-chain alkyl group having 1 to 6 carbon atoms, such as methyl, ethyl, n-propyl, isopropyl, n-butyl, isobutyl, tert-butyl, sec-butyl, 1-ethylpropyl, n-pentyl, neopentyl, n-hexyl, isohexyl, 3-methylphentyl;
l is an integer from 1 to 200;
m is an integer from 1 to 200;
n is an integer from 1 to 200.

The polyvinyl butyral dispersant may be removed by a thermal sintering process for manufacturing a capacitor. Thus, the polyvinyl butyral dispersant may not affect a dielectric grain growth differently from a phosphate dispersant.

Also, a polypropylene glycol monoalkyl ether dispersant such as propylene glycol methyl ether, another non-phosphate dispersant, may have a boiling point of 120° C., and have a molecular weight of 90 g/mol, whereas the polyvinyl butyral dispersant, the low polymerization binder type dispersant in the exemplary embodiment, may have a higher boiling point of 145° C. Accordingly, according to the exemplary embodiment, it may be easy to establish conditions of a forming process and a process of drying a formed sheet during a process of manufacturing a multilayer ceramic condenser, and 10,000 g/mol or higher of molecular weight may be synthesized. Thus, implementation of sheet strength may improve.

The low polymerization binder type dispersant in the dielectric composition according to the exemplary embodiment may include 0.5 to 1 part by weight based on the ceramic powder of 100 parts by weight in the dielectric composition. In one embodiment of the present invention, the low polymerization binder type dispersant may include 0.6 part by weight, 0.7 part by weight, 0.8 part by weight, or 0.9 part by weight based on the ceramic powder of 100 parts by weight in the dielectric composition.

When the low polymerization binder type dispersant is included less than 0.5 part by weight, dispersibility may degrade due to coarse grains formed by agglomeration of a ceramic powder. When the low polymerization binder type dispersant is greater than 1 part by weight, physical properties of a ceramic sheet manufactured using a dielectric composition may degrade, and a large amount of carbon residues may be created during a plasticizing process.

The high polymerization binder may have a degree of polymerization greater than 1,000. In one embodiment of the present invention, the high polymerization binder may have a degree of polymerization greater than 10,000, 100,000, or 1,000,000, and less than 10,000,000, less than 100,000,000, or less than 1,000,000,000. Examples of the high polymerization binder of the present invention include: Ethylene Vinyl Acetate (EVA), Polyvinyl butyral (PVB), and Polyacrylonitrile (PAN). A molecular weight of the high polymerization binder ranges from about $6.0 \times 10^4$ to about $11.0 \times 10^4$ (or more than $6.0 \times 10^4$). The high polymerization binder may not include phosphoric acid.

With regard to the high polymerization binder, a high polymerization binder may be generally used to secure stability of a formed sheet. In this case, a degree of polymerization may be related to viscosity of slurry, and it may be necessary to use an appropriate high polymerization binder in terms of a thickness of a sheet to use.

The high polymerization binder may be included 4.5 to 9.0 parts by weight based on the ceramic powder of 100 parts by weight in the dielectric composition. In one embodiment of the present invention, the high polymerization binder may be included 5.0 parts by weight, 5.5 parts by weight, 6.0 parts by weight, 6.5 parts by weight, 7.0 parts by weight, 7.5 parts by weight, 8.0 parts by weight, or 8.5 parts by weight based on the ceramic powder of 100 parts by weight in the dielectric composition.

Experimental Embodiment

Figure 4A:
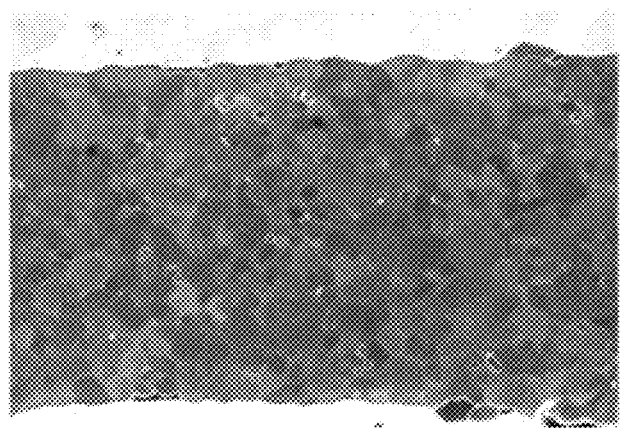
FIGS. 4A and 4B are images of analysis of a dielectric layer (embodiment) formed using a polyvinyl butyral dispersant.
Figure 4B:
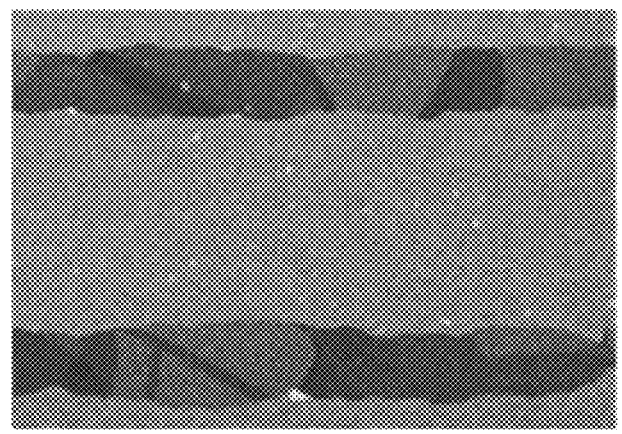
Figure 5A:
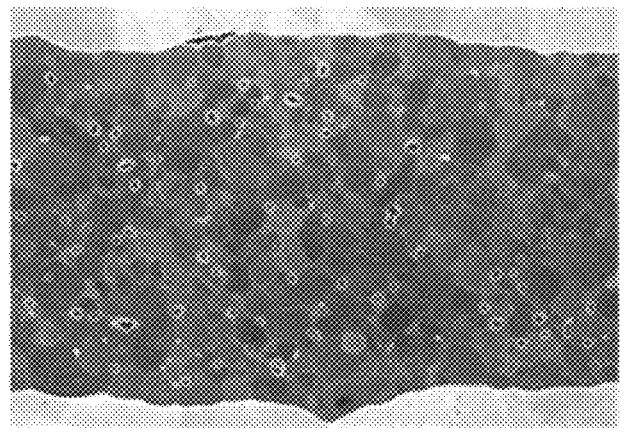
FIGS. 5A and 5B are images of analysis of a dielectric layer (comparative example) formed using a phosphate dispersant.
Figure 5B:
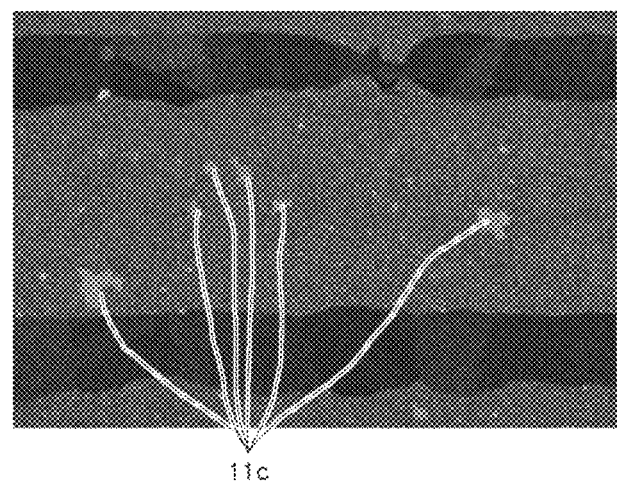

FIGS. 4A and 4B are images of analysis of a dielectric layer formed using a polyvinyl butyral dispersant (embodiment). FIGS. 5A and 5B are images of analysis of a dielectric layer formed using a phosphate dispersant (comparative example).

Figure 2:
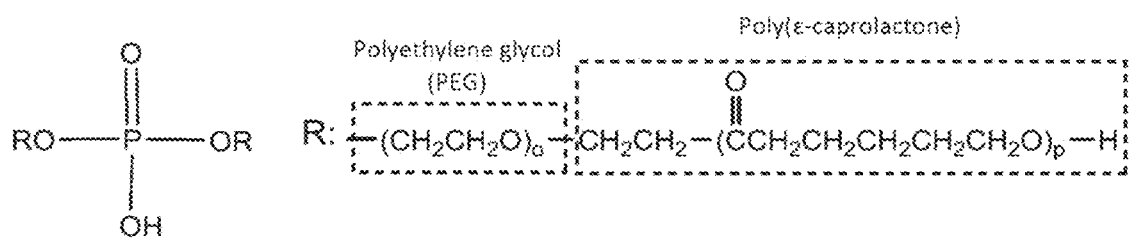
FIG. 2 is a structural formula of one example of a phosphate dispersant.

The polyvinyl butyral dispersant in the embodiment is a polyvinyl butyral dispersant having a structural formula in FIG. 1, and the phosphate dispersant in the comparative example may be BYK-103, a phosphate dispersant having a structural formula in FIG. 2. The BYK-103 may be a dispersant having a structure in which polyethylene glycol (PEG) units are connected in an ester structure and including phosphoric acid.

Comparing FIGS. 4A and 5A, the images taken by a scanning electron microscope (SEM), grains included in the dielectric layer in the embodiment (FIG. 4A) had smaller diameters and were more uniformly dispersed, as compared to grains included in the dielectric layer in the comparative example (FIG. 5A).

Also, comparing FIGS. 4B and 5B, results of observation of an abnormal grain growth in an SEM-energy-selective backscatter (EsB) mode, a plurality of abnormal grain growths 11c occurred in the comparative example, but in the embodiment, almost no abnormal grain growth occurred.

In each of the comparative examples and the embodiments, 4000 samples were prepared, and a high accelerated life test (HALT) were performed at temperature of 130° C. and at 2×Vr (constant voltage). As a result, in the embodiment, seven samples were defective (defective rate: 0.18%) out of 4000 samples, and in the comparative example, 27 samples were defective (defective rate: 0.68%) out of 4000 samples.

Thus, according to the exemplary embodiment, by applying the non-phosphate low polymerization binder type dispersant, reliability may improve.

Capacitor Component

Figure 6:
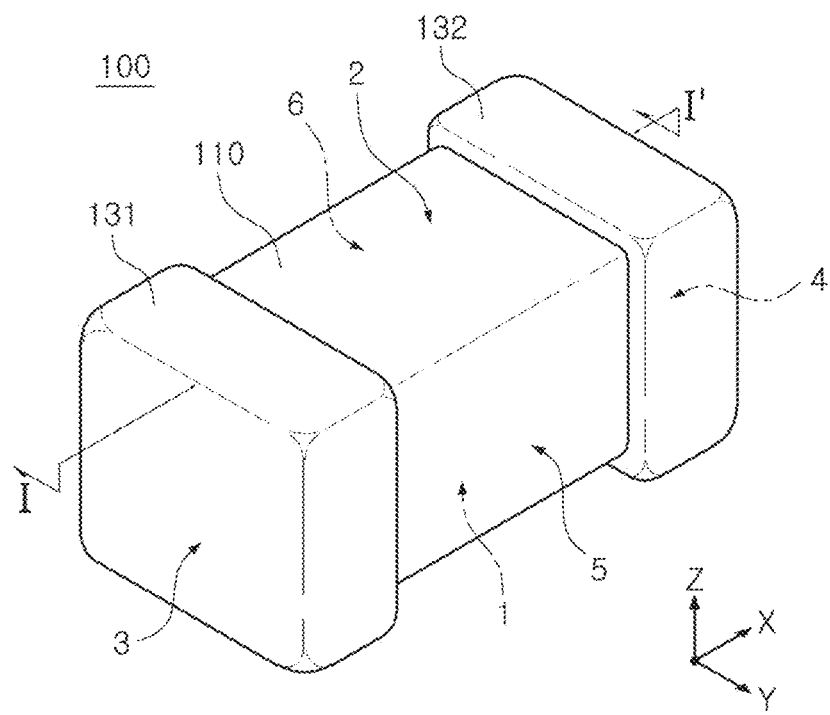
FIG. 6 is a perspective diagram illustrating a capacitor component according to another exemplary embodiment in the present disclosure.

FIG. 6 is a perspective diagram illustrating a capacitor component according to another exemplary embodiment.

Figure 7:
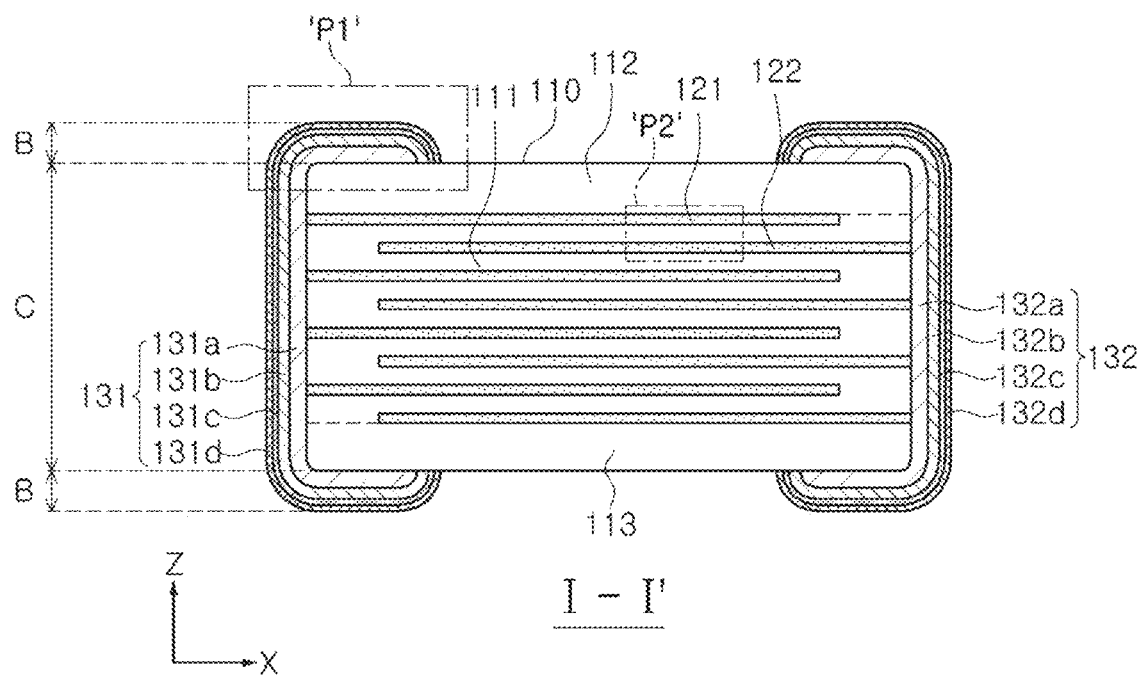
FIG. 7 is a cross-sectional diagram taken along line I-I' in FIG. 6.

FIG. 7 is a cross-sectional diagram taken along line I-I' in FIG. 6.

Figure 8A:
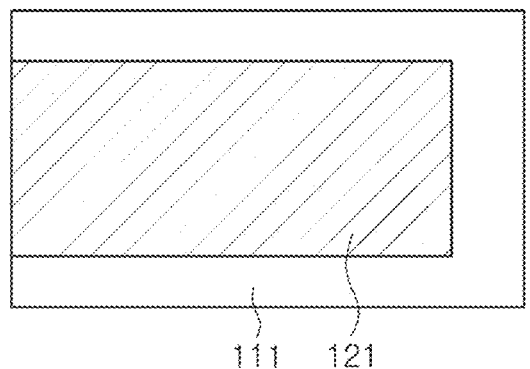
FIG. 8A is a diagram illustrating a ceramic green sheet on which a first internal electrode is printed.
Figure 8B:
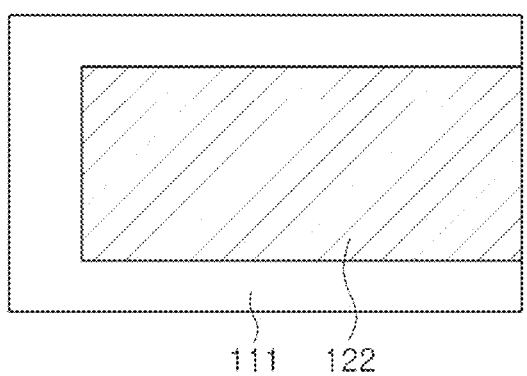
FIG. 8B is a diagram illustrating a ceramic green sheet on which a second internal electrode is printed.

FIG. 8A is a diagram illustrating a ceramic green sheet on which a first internal electrode is printed, and FIG. 8B is a diagram illustrating a ceramic green sheet on which a second internal electrode is printed.

Figure 9:
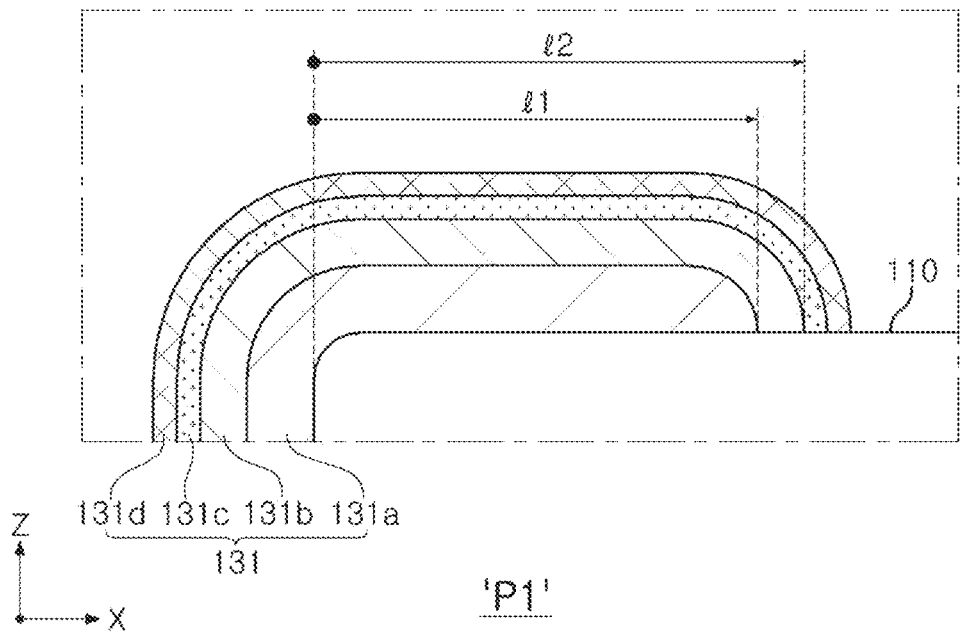
FIG. 9 is a diagram illustrating a region P1 illustrated in FIG. 7 in magnified form.

FIG. 9 is a diagram illustrating a Region P1 illustrated in FIG. 7 in magnified form.

Figure 10:
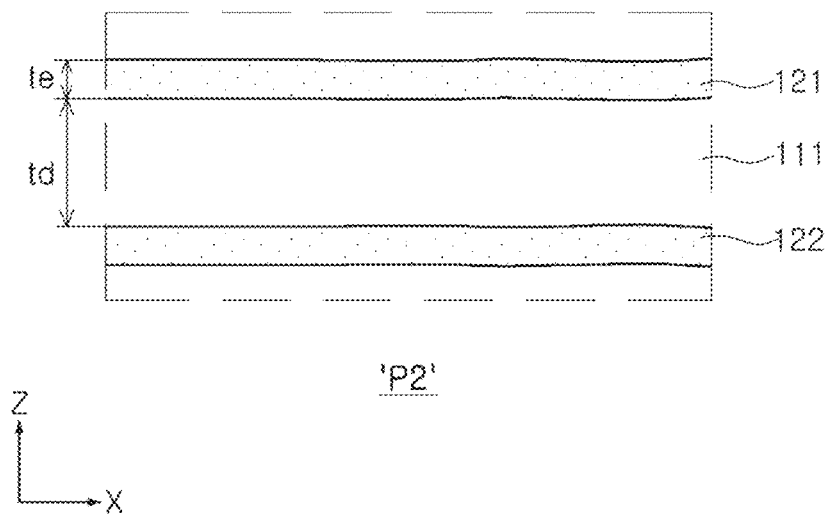
FIG. 10 is a diagram illustrating a region P2 illustrated in FIG. 7 in magnified form.

FIG. 10 is a diagram illustrating a Region P2 illustrated in FIG. 7 in magnified form.

In the description below, a capacitor component according to an exemplary embodiment will be described with reference to FIGS. 6 to 10.

A capacitor component 100 according to another exemplary embodiment may be manufactured using the dielectric composition in the exemplary embodiment described above.

The capacitor component 100 according to the exemplary embodiment may include a body 110 comprising a dielectric layer 111, and first and second internal electrodes 121 and 122 opposing each other with the dielectric layer interposed therebetween, and first and second external electrodes 131 and 132 disposed externally on the body 110 and electrically connected to the first and second internal electrodes, respectively. The dielectric layer may contain P of 0.1 wt % or lower.

In the body 110, the dielectric layer 111 and the internal electrodes 121 and 122 may be alternately layered.

A shape of the body 110 may not be limited to any particular shape, but as illustrated in the diagram, the body 110 may have a hexahedral shape or a shape similar to a hexahedron. Due to contraction of a ceramic powder included in the body 110 during a sintering process, the body 110 may have substantially a hexahedral shape although the hexahedral shape may not be an exact hexahedron formed by straight lines.

The body 110 may have first and second surfaces 1 and 2 opposing each other in a thickness direction (Z direction), third and fourth surfaces 3 and 4 connected to the first and second surfaces 1 and 2 and opposing each other in a length direction (X direction), and fifth and sixth surfaces 5 and 6 connected to the first and second surfaces 1 and 2 and the third and fourth surfaces 3 and 4 and opposing each other in a width direction (Y direction).

The plurality of dielectric layers 111 forming the body 110 may be in a sintered state, and the dielectric layers 111 may be integrated such that boundaries between adjacent dielectric layers 111 may be difficult to identify without using a scanning electron microscope (SEM).

The dielectric composition forming the dielectric layers 111 may include a ceramic powder, a high polymerization binder, and a low polymerization binder type dispersant having a degree of polymerization between 100 and 1,000, as described in the aforementioned exemplary embodiment. The descriptions of the dielectric composition overlapping the aforementioned descriptions will not be repeated.

According to the exemplary embodiment, as the low polymerization binder type dispersant having a degree of polymerization between 100 and 1,000 is used instead of a phosphate dispersant, the dielectric layer may contain phosphorus (P) in an amount of 0.1 wt % or lower, preferably 0.05 wt % or lower, or more preferably 0.01 wt % or lower. The configuration in which a content of P is 0.1 wt % or lower may indicate that P may be added to the minimum as an impurity, and that P may not be included in the dielectric composition, a material of the dielectric layer.

Thus, the dielectric layer 111 in the exemplary embodiment may have a uniform microstructure and improved reliability as an abnormal grain growth is prevented.

Further, in the dielectric layers 111, P may not be detected when energy dispersive spectrometer analysis is performed.

The body 110 may include a capacitance forming portion disposed in the body 110 and forming capacitance including the first internal electrode 121 and the second internal electrode 122 disposed to oppose each other with the dielectric layer 111 interposed therebetween, and upper and lower cover portions 112 and 113 disposed on upper and lower portions of the capacitance forming portion.

The capacitance forming portion may contribute to formation of capacitance of a capacitor, and may be formed by alternately layering the plurality of the first and second internal electrodes 121 and 122 with the dielectric layers 111 interposed therebetween.

The upper cover portion 112 and the lower cover portion 113 may be formed by disposing a single dielectric layer or by layering two or more dielectric layers on upper and lower surfaces of the capacitance forming portion, respectively, and may prevent damage to an internal electrode caused by physical or chemical stress.

The upper cover portion 112 and the lower cover portion 113 may not include an internal electrode, and may include the same material as a material of the dielectric layers 111.

The plurality of the first and second internal electrodes 121 and 122 may be disposed to oppose each other with the dielectric layers 111 interposed therebetween.

The internal electrodes may include the first and second internal electrodes 121 and 122 alternately disposed with the dielectric layers 111 interposed therebetween.

The first and second internal electrodes 121 and 122 may be exposed to the third and fourth surfaces 3 and 4 of the body 110, respectively.

Referring to FIG. 7, the first internal electrode 121 may be spaced apart from the fourth surface 4 and may be exposed through the third surface. The second internal electrode 122 may be spaced apart from the third surface 3 and may be exposed through the fourth surface 4. The first external electrode 131 may be disposed on the third surface 3 of the body and connected to the first internal electrode 121, and the second external electrode 132 may be disposed on the fourth surface 4 and connected to the second internal electrode 122.

The first and second internal electrodes 121 and 122 may be electrically isolated from each other by the dielectric layer 111 interposed therebetween. The body 110 may be formed by layering a ceramic green sheet (FIG. 8A) on which the first internal electrode 121 is printed and a ceramic green sheet (FIG. 8B) on which the second internal electrode 122 is printed, and performing a sintering process.

A method of printing the conductive paste may be a screen printing method, a gravure printing method, or the like. However, the method is not limited thereto.

The first and second external electrodes 131 and 132 may be disposed in an outer portion of the body 110 and may be connected to the first and second internal electrodes 121 and 122, respectively. As illustrated in FIG. 7, the first and second external electrodes 131 and 132 respectively connected to the first and second internal electrodes 121 and 122 may be included.

The first and second external electrodes 131 and 132 may be electrically connected to the first and second internal electrodes 121 and 122, respectively, to form capacitance, and the second external electrode 132 may be connected to a potential different from a potential to which the first external electrode 131 is connected.

The external electrodes 131 and 132 may include electrode layers 131a and 132a, respectively, connected to the internal electrodes 121 and 122, respectively, and conductive resin layers 131b and 132b disposed on the electrode layers, respectively.

The external electrodes 131 and 132 may further include Nickel (Ni) plated layers 131c and 132c disposed on the conductive resin layers 131b and 132b, and Tin (Sn) plated layers 131d and 132d disposed on the Ni plated layers 131c and 132c.

When the first and second external electrodes 131 and 132 include the first and second external electrodes 131 and 132, the first external electrode 131 may include the electrode layer 131a, the first conductive resin layer 131b, the first Ni plated layer 131c, and the first Sn plated layer 131d, and the second external electrode 132 may include the second electrode layer 132a, the second conductive resin layer 132b, the first Ni plated layer 132c and the first Sn plated layer 132d.

The electrode layers 131a and 132a may include one or more conductive metals and glass.

The conductive metal used in the electrode layers 131a and 132a may not be limited to any particular material as long as the electrode layers 131a and 132a are able to be electrically connected to the internal electrodes. The conductive material may include, for example, one or more materials selected from a group comprised of copper (Cu), silver (Ag), nickel (Ni), and alloys thereof.

The electrode layers 131a and 132a may be formed by applying a conductive paste made by adding glass frit to a powder of the conductive metal, and performing a sintering process.

The conductive resin layers 131b and 132b may be formed on the electrode layers 131a and 132a, and may entirely cover the electrode layers 131a and 132a.

The conductive resin layers 131b and 132b may include a conductive metal and a base resin.

The base resin included in the conductive resin layers 131b and 132b may not be limited to any particular material as long as the material has adhesion properties and shock absorption properties and is able to be mixed with the conductive metal powder to make a paste. The material may include an epoxy resin, for example.

The conductive metal included in the conductive resin layers 131b and 132b may not be limited to any particular material as long as the material is able to be electrically connected to the electrode layers 131a and 132a. The material may include, for example, one or more materials selected from a group comprised of copper (Cu), silver (Ag), nickel (Ni) and alloys thereof.

The Ni plated layers 131c and 132c may be formed on the conductive resin layers 131b and 132b, and may entirely cover the conductive resin layers 131b and 132b.

The Sn plated layer 131d and 132d may be formed on the Ni plated layers 131c and 132c, and may entirely cover the Ni plated layers 131c and 132c.

The Sn plated layer 131d and 132d may improve mounting properties.

The first and second external electrodes 131 and 132 may include a connection portion C disposed on the third surface 3, and a band portion B extending to portions of the first and second surfaces 1 and 2 from the connection portion C. Similarly, the second external electrode 132 may include a connection portion disposed on the fourth surface 4 of the body, and a band portion extending to portions of the first and second surfaces 1 and 2 from the connection portion.

The band portion B may extend to portions of the fifth and sixth surfaces 5 and 6 from the connection portion C as well as extending to the first and second surfaces 1 and 2.

Referring to FIG. 9, a first external electrode 131 may be configured such that a distance l1 from a third surface 3 of a body 110 to an end of a band portion B of a first electrode layer 131a may be shorter than a distance l2 to an end of the band portion B of a first conductive resin layer 131b.

Similarly, a second external electrode 132 may be configured such that a distance from a fourth surface 4 of the body 110 to an end of the band portion of a second electrode layer 132a may be shorter than a distance to an end of the band portion of a second conductive resin layer 132b.

Thus, the conductive resin layers 131b and 132b may be configured to entirely cover the electrode layers 131a and 132a, and strength against warpage and adhesion force between the external electrode and the body may be enhanced.

Referring to FIG. 10, with regard to a capacitor component according to another exemplary embodiment, a thickness, td, of a dielectric layer 111 and a thickness, te, of internal electrodes 121 and 122 may satisfy td>2*te.

In other words, according to the exemplary embodiment, the thickness, td, of the dielectric layer 111 may be twice greater than the thickness, te, of the first and second internal electrodes 121 and 122.

Generally, a high voltage electrical electronic device has had an issue of reliability caused by degradation of insulation breakdown voltage in a high voltage environment.

The capacitor component according to the exemplary embodiment may be configured such that the thickness, td, of the dielectric layer 111 may be configured to be greater than two times the thickness, te, of the internal electrodes 121 or 122 to prevent degradation of insulation breakdown voltage in a high voltage environment. Accordingly, the thickness of the dielectric layer, a distance between the internal electrodes, may be increased, thereby improving insulation breakdown voltage properties.

When the thickness, td, of the dielectric layer 111 is less than or equal to two times the thickness, te, of the internal electrodes 121 or 122, the thickness of the dielectric layer, a distance between the internal electrodes, may become thin, and insulation breakdown voltage may degrade.

The thickness, te, of the internal electrode may be less than 1 µm, and the thickness, td, of the dielectric layer 111 may be less than 2.8 µm, but the thicknesses may not be limited thereto. In one embodiment, the thickness, te, of the internal electrode may be 0.9 µm, 0.8 µm, 0.7 µm, 0.6 µm, or 0.5 µm. In one embodiment, the thickness, td, of the dielectric layer 111 may be 2.0 µm, 2.1 µm, 2.2 µm, 2.3 µm, 2.4 µm, 2.5 µm, 2.6 µm, or 2.7 µm.

According to the aforementioned exemplary embodiments, by applying a non-phosphate dispersant, an abnormal grain growth may be prevented, and the dielectric layer having a uniform microstructure may be secured, thereby improving reliability of a capacitor component.

While the exemplary embodiments have been shown and described above, it will be apparent to those skilled in the art that modifications and variations could be made without departing from the scope of the present invention as defined by the appended claims.

What is claimed is:

1. A dielectric composition, comprising:
a ceramic powder;
a polymerization binder having a degree of polymerization greater than 1,000; and
a low polymerization binder dispersant having a degree of polymerization between 100 and 1,000
wherein the low polymerization binder dispersant is a polyvinyl butyral dispersant represented by the following formula (I):

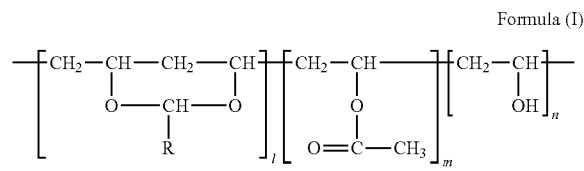

Formula (I)

wherein:
R is n-propyl;
l is an integer from 1 to 200;
m is an integer from 1 to 200; and
n is an integer from 1 to 200,
wherein the polymerization binder includes at least one of: ethylene vinyl acetate (EVA), polyvinyl butyral (PVB), or polyacrylonitrile (PAN).

2. The dielectric composition of claim 1, wherein the low polymerization binder dispersant is included in 0.5 to 1 part by weight based on the ceramic powder of 100 parts by weight.

3. The dielectric composition of claim 1, wherein the polymerization binder comprises 4.5 to 9.0 parts by weight based on the ceramic powder of 100 parts by weight.

4. The dielectric composition of claim 1, wherein the ceramic powder is selected from the group consisting of $BaTiO_3$, $(Ba_{1-x}Ca_x)Ti_{1-y}Ca_yO_3$, $(Ba_{1-x}Ca_x)(Ti_{1-y}Zr_y)O_3$, $Ba(Ti_{1-y}Zr_y)O_3$, or $(Ba_{1-x}Ca_x)Ti_{1-y}Sn_yO_3$, wherein x is 0 to 0.9, and y is 0 to 0.9, and a mixture thereof.

5. The dielectric composition of claim 1, wherein the polyvinyl butyral dispersant has a boiling point of 145° C.

6. The dielectric composition of claim 1, wherein the degree of polymerization of the polymerization binder is greater than 100,000.

7. The dielectric composition of claim 1, wherein the degree of polymerization of the polymerization binder is greater than 1,000,000.

8. The dielectric composition of claim 1, wherein the degree of polymerization of the polymerization binder is less than 10,000,000.

9. The dielectric composition of claim 1, wherein the degree of polymerization of the polymerization binder is less than 100,000,000.

10. The dielectric composition of claim 1, wherein the degree of polymerization of the polymerization binder is less than 1,000,000,000.

11. The dielectric composition of claim 1, wherein a molecular weight of the polymerization binder having a degree of polymerization greater than 1,000 is in a range from $6.0 \times 10^4$ to $11.0 \times 10^5$.

12. The dielectric composition of claim 1, wherein the polymerization binder having a degree of polymerization greater than 1,000 comprises ethylene vinyl acetate.

13. The dielectric composition of claim 1, wherein the polymerization binder having a degree of polymerization greater than 1,000 comprises polyvinyl butyral.

14. The dielectric composition of claim 1, wherein the polymerization binder having a degree of polymerization greater than 1,000 comprises polyacrylonitrile.

15. The dielectric composition of claim 1, wherein the polymerization binder comprises 5.0 to 8.5 parts by weight based on the ceramic powder of 100 parts by weight.

16. The dielectric composition of claim 1, wherein the polymerization binder comprises 5.5 to 8.0 parts by weight based on the ceramic powder of 100 parts by weight.

17. The dielectric composition of claim 1, wherein the polymerization binder comprises 6.0 to 7.5 parts by weight based on the ceramic powder of 100 parts by weight.

18. The dielectric composition of claim 1, wherein the polymerization binder includes ethylene vinyl acetate (EVA).

19. The dielectric composition of claim 1, wherein the polymerization binder includes polyvinyl butyral (PVB).

20. The dielectric composition of claim 1, wherein the polymerization binder includes polyacrylonitrile (PAN).

* * * * *